(12) United States Patent
Braun et al.

(10) Patent No.: US 9,050,761 B2
(45) Date of Patent: Jun. 9, 2015

(54) METHOD OF DOSING A LENS FORMING MATERIAL INTO A MOLD

(75) Inventors: Matthias Braun, Kleinwallstadt (DE); Axel Heinrich, Aschaffenburg (DE); Peter Hagmann, Erlenbach am Main (DE)

(73) Assignee: Novartis AG (CH)

( * ) Notice: Subject to any disclaimer, the term of this patent is extended or adjusted under 35 U.S.C. 154(b) by 315 days.

(21) Appl. No.: 12/969,681

(22) Filed: Dec. 16, 2010

(65) Prior Publication Data

US 2011/0147956 A1 Jun. 23, 2011

Related U.S. Application Data

(60) Provisional application No. 61/287,474, filed on Dec. 17, 2009.

(51) Int. Cl.
*B29D 11/00* (2006.01)

(52) U.S. Cl.
CPC .... *B29D 11/00413* (2013.01); *B29D 11/00038* (2013.01); *B29D 11/00134* (2013.01); *B29D 11/00538* (2013.01)

(58) Field of Classification Search
USPC ........ 264/1.1, 1.38, 2.5, 328.1; 425/175, 808, 425/542, 566
IPC ............... B29D 11/00038,11/00134, 11/00413, B29D 11/00432, 11/00442
See application file for complete search history.

(56) References Cited

U.S. PATENT DOCUMENTS

| | | | |
|---|---|---|---|
| 3,136,000 A | 6/1964 | Slyk | |
| 4,680,149 A | 7/1987 | Rawlings | |
| 5,244,377 A * | 9/1993 | Danker | 425/542 |
| 5,928,682 A * | 7/1999 | Janca et al. | 425/566 |
| 6,863,848 B2 | 3/2005 | Engardio | |
| 2001/0031318 A1* | 10/2001 | Nishibayashi et al. | 427/430.1 |
| 2004/0041287 A1 | 3/2004 | Engardio | |

FOREIGN PATENT DOCUMENTS

WO 9842497 A2 10/1998

OTHER PUBLICATIONS

PCT International Search Report dated Apr. 13, 2011, International Application No. PCT/EP2010/069936, International Filing Date Dec. 16, 2010.
PCT Written Opinion of the International Searching Authority dated Apr. 13, 2011, International Application No. PCT/EP2010/069936, International Filing Date Dec. 16, 2010.

\* cited by examiner

*Primary Examiner* — Mathieu Vargot
(74) *Attorney, Agent, or Firm* — Robert A. Ambrose

(57) ABSTRACT

There is described a method of dosing a lens forming material into a mold (1;21), which comprises dosing a metered amount of a lens forming material (P) including a volatile solvent into a mold cavity (4) enclosed by a female mold half (2) and a male mold half of a mold (1;21). The lens forming material (P) is subsequently polymerized and/or cross-linked to form an ophthalmic lens, in particular a contact lens. Dosing of the lens forming material (P) into the mold cavity (4) is accomplished while the mold halves (2, 3) are associated with each other substantially gas-tight. There is also described an apparatus for carrying out the method.

9 Claims, 1 Drawing Sheet

METHOD OF DOSING A LENS FORMING MATERIAL INTO A MOLD

This application claims the benefit under 35 U.S.C. §119 (e) of U.S. provisional application Ser. No. 61/287,474, filed on Dec. 17, 2009, incorporated herein by reference in its entirety.

FIELD

The invention relates to a method of dosing a lens forming material into a mold and an apparatus therefor.

BACKGROUND

It is well established in the art to produce ophthalmic lenses, more specifically hard and soft contact lenses, in an automated production process with reusable molds. In mass production of contact lenses, specifically so-called disposable lenses, a large number of contact lenses must be manufactured in a relatively short period of time. In an advantageous method of mass production, a lens forming material, e.g., a polymer or prepolymer solution, such as a polymer or prepolymer solution containing water, is introduced into a female mold half, the casting mold is closed by the respective male mold half and then the lens forming material is polymerized and/or cross-linked with ultraviolet (UV) light. The mold halves mask the UV light in the respective areas, which are outside of the areas required for contact lens production. Such mass production of contact lenses may be performed in a closed loop process and is described in WO 98/42497, for example. Suitable polymers formed by photochemical polymerization of suitable prepolymers include polymers based on polyvinyl alcohols (PVA) or silicone hydrogels (SiHy) as well as based on polyethylene glycols (PEG).

There are known lens forming materials which include a solvent, for example silicone hydrogels (SiHy), which may contain alcohols, such as propanol or isopropanol or other, as a solvent. Solvents, for example propanol, however, are typically volatile. Thus, if a solvent containing lens forming material is dosed into the female mold half of the opened mold, at least a portion of the solvent evaporates before the mold is closed again. Due to the reduced amount of solvent the lens forming material changes its properties, which, after the lens forming material has been polymerized or cross-linked may result in streaks or other defects or undesirable property changes on or in the formed lens. Such defects, such as streaks, if located in the vision area of the lens, may be intolerable so that the lens must be rejected after inspection. In addition, residues of lens forming material having a reduced solvent content may deposit at the tip of the dosing unit and influence the accuracy of the next dosing process in an adverse manner. Also, volatile solvents are very often easily inflammable and/or explosive so that special provisions must be taken if such materials are used.

It is an object of the present invention avoid the evaporation of volatile solvents or to keep the evaporation of volatile solvents, such as, e.g., propanol, from lens forming materials at least at a low level. A method of dosing a lens forming material into a mold is described which allows to obtain ophthalmic lenses, in particular contact lenses, which are free from streaks. In addition, an accurate metering of the lens forming material into the mold shall be possible.

SUMMARY

These and still further objects are met by a method of dosing a lens forming material into a mold which comprises the steps specified in the independent method claim. Further improvements of the method according to the invention and preferred embodiments are the subject of the dependent method claims.

In embodiments there is a method of dosing a lens forming material into a mold, which comprises dosing a metered amount of a lens forming material including a volatile solvent into a mold cavity enclosed by a male mold half and a female mold half of the mold. The male and female mold halves enclose a mold cavity in which the lens forming material is subsequently polymerized and/or cross-linked to form an ophthalmic lens, in particular a contact lens. The dosing of the lens forming material into the mold cavity is accomplished while the male and female mold halves are associated with each other substantially gas-tight.

By having the mold halves associated with each other in a substantially gas-tight manner the volatile solvent cannot evaporate as it occurs with the mold halves in an open state. Thus, the solvent remains in the lens forming material so that the properties thereof remain unchanged and the formation of defects such as streaks during polymerization and/or cross-linking of the lens forming material is avoided. In addition, no special provisions must be taken to prevent inflammation or explosion of the volatile solvent. For carrying out the method it must only be ascertained that the mold halves are associated with each other in a nearly gas-tight condition. For that reason, according to one variant of the process or method according to the invention the mold halves may be held in a closed or nearly closed position. This allows advantageous process variants which will be discussed hereafter.

In one embodiment of the method according to the invention the dosing of the lens forming material into the mold cavity is accomplished through a dosing channel, which is connected with the mold cavity and is accessible from the outside of the mold. It may be advantageous if the dosing channel is provided radially in vicinity of a separation plane of the male and female mold halves and extends through a guide sleeve which holds the male and female mold halves. The guide sleeve alleviates a controlled relative motion of the two mold halves. At the same time it fulfills the function of a nearly gas-tight seal between the two mold halves. The dosing channel extends radially and does not interfere with the molding surfaces on the female and male mold halves; rather, it opens at a peripheral portion of the mold cavity. During UV-polymerization and/or cross-linking this portion is masked. Thus, the dosing channel does not affect the edge of the formed lens and the lens forming material within the dosing channel remains flowable, which alleviates the cleaning of the mold.

In an embodiment of the method according to the invention the dosing is accomplished with a dosing needle which, for the dosing process, is attached to and sealingly received by the dosing channel. The tip of the dosing needle is adapted to the shape of the dosing channel. Thus, simply by inserting the dose needle into the dosing channel a sealing is accomplished.

It may be advantageous for the dosing process if during the dosing of the lens forming material air which is contained in the mold cavity is expelled. For that purpose there may be provided at least one venting opening which extends through the guide sleeve and is connected with the mold cavity.

By dosing the lens forming material into the mold cavity with a pressure above ambient conditions the time required for the dosing may be reduced and optimized. With the lens forming material used and with the width of the dosing channel dosing pressures of about 0.1 bar to about 5 bar above ambient pressure may be suitable.

In an embodiment of the method according to the invention the lens forming material is dosed into the mold cavity with the male and female mold halves being held in the nearly closed position. The male and female mold halves are then completely closed during the polymerization and/or cross-linking of the lens forming material. The closing of the mold halves may be accomplished actively by the use of an activator, and/or passively, due to the attracting forces the lens forming material exerts on the mold halves during shrinkage. By closing the mold halves completely shrinkage of the lens forming material, which may occur during the polymerization and/or cross-linking of the material, may be compensated for.

In another embodiment of the method according to the invention the lens forming material is dosed into the mold cavity with the male and female mold halves being held in the completely closed position. During the polymerization and/or cross-linking of the lens forming material additional lens forming material may be introduced through the dosing channel into the mold cavity in order to compensate for shrinkage of the material. The additional material may be actively injected, or it may be sucked into the mold cavity automatically due to an underpressure which builds up because of the shrinkage process.

The method of dosing into the mold cavity with the male and female mold halves being held in the closed or nearly closed position may be accomplished with practically all lens forming materials. It is, however, of particular advantage with lens forming materials which comprise a volatile solvent. Accordingly, in an embodiment of the invention a silicone hydrogel (SiHy) material comprising propanol as a solvent is used as the lens forming material.

An embodiment of an apparatus for carrying out the method according to the invention in order to form an ophthalmic lens, in particular a contact lens, from a lens forming material which is dosed into a mold cavity that is enclosed by molding surfaces of a male mold half and a corresponding female mold half. The mold halves are slidingly held in a guide sleeve that forms a nearly gas-tight sealing for the associated male and female mold halves. The apparatus comprises a dosing channel, which extends substantially radially from the mold cavity and through the guide sleeve. The dosing channel is adapted to sealingly receive the tip of a dosing needle. The apparatus is simple in construction. The male and female mold halves need not be modified. Only the guide sleeve must be provided with the radially extending dosing channel which may be connected with the mold cavity.

It may be advantageous for a fast dosing and venting of the mold, if the guide sleeve is provided with at least one venting opening which is in connected (i.e. in communication) with the mold cavity. In an embodiment of the apparatus the at least one venting opening in the guide sleeve may comprise a number of venting slots which are distributed about its circumference of the guide sleeve and are connected with the mold cavity.

These and still further features and advantages of the invention will become apparent from the following description of an exemplary embodiment thereof, reference being made to the schematic drawings, which are not to scale, in which:

DETAILED DESCRIPTION

The following description of exemplary embodiments of the invention is for illustrative purposes only and is not intended to limit of the scope of the invention.

The invention is exemplified with reference to the manufacture of ophthalmic lenses, in particular contact lenses, in a so-called full mold process. In this known automated production process a large number of contact lenses is manufactured with reusable molds in a closed loop process. A number of reusable molds, which each comprise associated male and female mold halves, are usually arranged in side by side configuration in worktrays which are transported consecutively through the individual treatment stations of a production line. The treatment stations comprise a dosing station, in which a lens forming material, usually a prepolymer or polymer solution, is metered into the mold, a polymerization station, in which the lens forming material is polymerized and/or cross-linked. The contact lenses are then removed from the molds and transported through an extraction, rinsing and washing station, a hydration station, a lens inspection station, a packaging station, and a sorting and storage station. The present invention relates to the dosing of the lens forming material into a mold, in which the ophthalmic lens, in particular a contact lens, is formed. Suitable polymers formed by photochemical polymerization of suitable prepolymers include, for example, polymers based on polyvinyl alcohols (PVA) or silicone hydrogels (SiHy) as well as based on polyethylene glycols (PEG).

Figure 1:
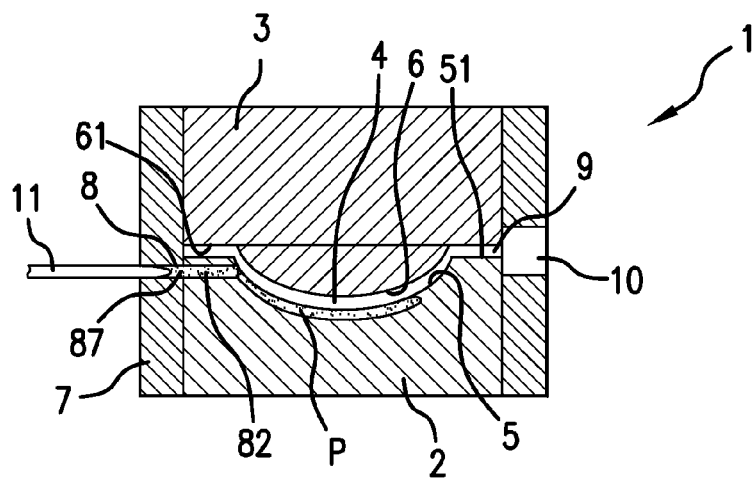
FIG. 1 is an axially sectioned view of a mold, with the male and female mold halves of the mold being positioned in a nearly closed state while lens forming material is injected into the mold cavity.

FIG. 1 shows an axially sectioned view of a typical mold, which is generally designated with reference numeral 1. The mold 1 comprises a female mold half 2 with a first molding surface 5 and a male mold half 3 with a second molding surface 6. In the closed state of the mold 1 the first and second molding surfaces 5, 6 delimit (enclose) a mold cavity 4, which corresponds in shape to that of the ophthalmic lens to be manufactured. The female and male mold halves 2, 3 are held circumferentially in a sliding fit of a guide sleeve 7 which allows a relative axial movement of the female and male mold halves 2, 3. In FIG. 1 the female and male mold halves 2, 3 are shown in a nearly closed position. Thus, a first annular shoulder 51 enclosing the first molding surface 5 of the female mold half 2 and a second annular shoulder 61 enclosing the second molding surface 6 on the male mold half 3 are axially spaced from each other a certain distance, which may amount to, e.g., from about 5 μm to about 15 μm. The guide sleeve 7, in which the female and male mold halves 2, 3 are held in a sliding fit, not only serves for an axial guidance of the mold halves 2, 3 but also constitutes a circumferential sealing for the two associated mold halves 2, 3, which is substantially gas-tight.

For injecting a lens forming material P into the nearly closed mold 1 there is provided a dosing channel 8, which extends about radially in vicinity of the first and second annular shoulders 51, 52 which constitute separation planes of the mold 1. The dosing channel 8 comprises an inner section 82 which is connected with the mold cavity 4 and an outer section 87 which extends radially through the guide sleeve 7. The dosing channel 8 is adapted to sealingly receive a tip of a dosing needle, which is indicated in FIG. 1 at reference numeral 11. The lens forming material P, in particular a polymer or prepolymer solution containing a volatile solvent is injected into the mold cavity 4, e.g., with a pressure of, for example, about 0.1 bar to about 5 bar above ambient pressure. During the dosing process air which is contained in the mold cavity 4 is expelled through at least one venting opening 10 in the guide sleeve 7. In an embodiment of the invention there are provided a number of venting openings 10 in form of axial slots along the circumference of the guide sleeve 7. The venting opening 10 in the guide sleeve 7 is in contact (i.e. connected) with the mold cavity 4. In the embodiment according to FIG. 1 this contact is established by an annular channel 9 which results from the separation distance between the first and second annular shoulders 51, 61. This separation distance amounts to, e.g. from about 5 µm to about 15 µm, and is wide enough to enable entrapped air to be expelled, but prohibits the injected lens forming material P from flowing out of the mold cavity 4.

Upon polymerization and/or cross-linking of the lens forming material P within the mold cavity 4 there may occur shrinkage of the lens forming material P. This shrinkage can be compensated for by the two mold halves 2, 3 moving into the completely closed position. The closing of the mold halves 2, 3 may be accomplished actively with the aid of actuators, such as, e.g., piezoelectric elements, and/or it may be accomplished passively by attraction forces between the lens forming material P and the molding surfaces 5, 6.

Figure 2:
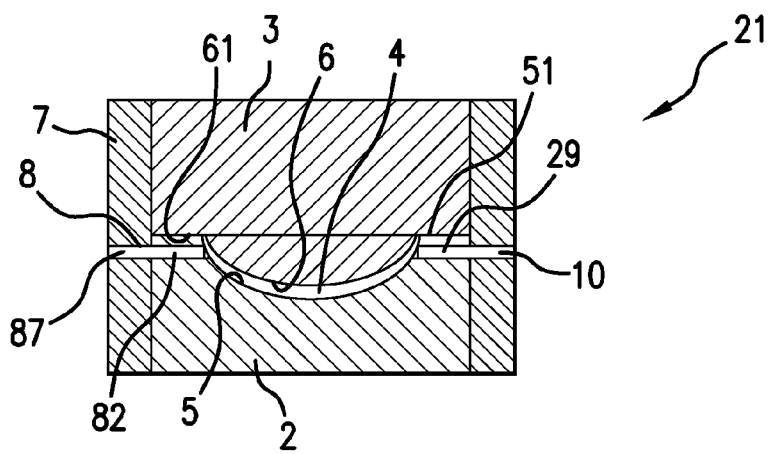
FIG. 2 is an axially sectioned view of a mold, with male and female mold halves of the mold being positioned in a completely closed state.

The example of a mold depicted in FIG. 2 is of a very similar construction to that of FIG. 1. Therefore, like components are designated with like reference numerals. The mold is generally designated with reference numeral 21 and comprises a female mold half 2 with a first molding surface 5 and a male mold half 3 with a second molding surface 6. The female and male mold halves 2, 3 are circumferentially guided in the sliding fit of a guide sleeve 7. The female and male mold halves 2, 3 are shown in a completely closed position, in which the two molding surfaces 5, 6 delimit the mold cavity 4. First and second annular shoulders 51, 61 are abutting each other. Dosing of the lens forming material is accomplished into mold cavity 4 of the closed mold 21 through a dosing channel 8, which extends about radially in vicinity of the annular shoulders 51, 61. The dosing channel 8 has an inner section 82 which extends in the female mold half 2 and an outer section 87 which extends through the guide sleeve 7. A dosing needle may be inserted into the dosing channel 8 which is adapted to provide a sealing fit. At least one venting channel 29 is provided in the female mold half 2 which opens into the mold cavity 4. The venting channel 29 is connected with at least one venting opening 10 in the guide sleeve 7. The cross-section of the venting channel is selected such, that air may easily be expelled but the flow of dosed lens forming material out of the mold cavity 4 is prohibited.

Figure 3:
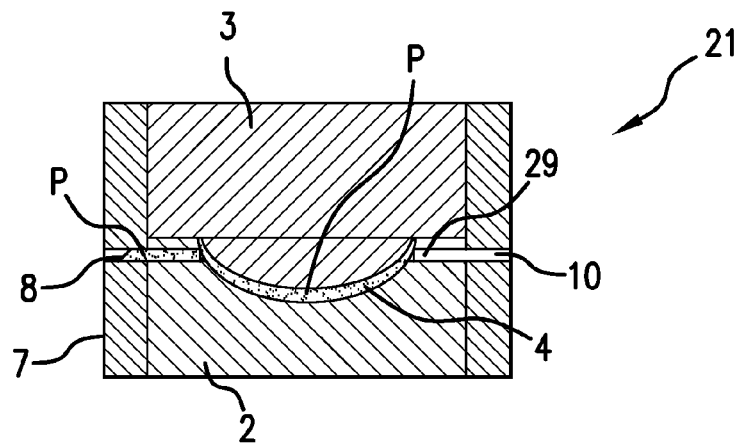
FIG. 3 is an axially sectioned view of a mold in accordance with FIG. 2, with the mold cavity being completely filled with lens forming material.

Finally, FIG. 3 shows the mold 21 of FIG. 2 in the state, in which the mold cavity 4 is completely filled with lens forming material P. The dosing channel 8 still contains a certain amount of lens forming material P, which may be sucked into the mold cavity 4 due to an overpressure which is created as the lens forming material P shrinks during the polymerization and/or cross-linking process. At the end, the mold 21 is opened in order to remove the formed ophthalmic lens, in particular a contact lens, and to continue the processing thereof.

The invention claimed is:

1. A method of forming a contact lens, which comprises dosing a metered amount of a contact lens forming material including a volatile solvent into a mold cavity enclosed by a male mold half with a second molding surface and a female mold half with a first molding surface of the contact lens mold, the mold cavity in a closed state of the contact lens mold corresponding to the shape of the contact lens to be manufactured, wherein the contact lens forming material is subsequently polymerized and/or cross-linked to form a contact lens, and wherein dosing of the contact lens forming material into the mold cavity is accomplished while the male and female mold halves are associated with each other substantially gas-tight to prevent evaporation of the solvent; and
   wherein the mold cavity is connected with a dosing channel, which is accessible from the outside of the contact lens mold and wherein dosing of the lens forming material is accomplished through this dosing channel, the dosing channel extending through a guide sleeve which holds the male and female mold halves; and
   further wherein during the dosing of the contact lens forming material, air contained in the mold cavity is expelled through at least one venting opening which is provided in the guide sleeve, and which venting opening is connected with the mold cavity by an annular channel which is from about 5 µm to about 15 µm wide.

2. The method according to claim 1, wherein dosing of the contact lens forming material into the mold cavity is accomplished while the male and female mold halves are held in a closed or nearly closed position.

3. The method according to claim 1, wherein the dosing channel is provided radially in vicinity of a separation plane of the male and female mold halves.

4. The method according to claim 3, wherein the dosing is accomplished with a dosing needle which, for the dosing process, is attached to and sealingly received by the dosing channel.

5. The method according to claim 2, wherein the dosing of the contact lens forming material is accomplished with pressure above ambient conditions.

6. The method according to claim 5, wherein the contact lens forming material is injected into the mold cavity with a pressure above ambient conditions of about 0.1 bar to about 5 bar.

7. The method according to claim 1, wherein the contact lens forming material is dosed into the mold cavity with the male and female mold halves being held in the nearly closed position, and wherein the male and female mold halves are completely closed during the polymerization and/or cross-linking of the contact lens forming material.

8. The method according to claim 1, wherein the contact lens forming material is dosed into the mold cavity with the male and female mold halves being held in the completely closed position, and wherein during polymerization and/or cross-linking of the contact lens forming material additional contact lens forming material may be introduced into the mold cavity for compensation of shrinkage.

9. The method according to claim 1, wherein the contact lens forming material is a silicone hydrogel lens forming material comprising propanol as a solvent.

* * * * *